No. 872,673. PATENTED DEC. 3, 1907.
R. A. NOCK.
FRAME AND BACK RETAINING DEVICE THEREFOR.
APPLICATION FILED MAY 18, 1907.
2 SHEETS—SHEET 1.
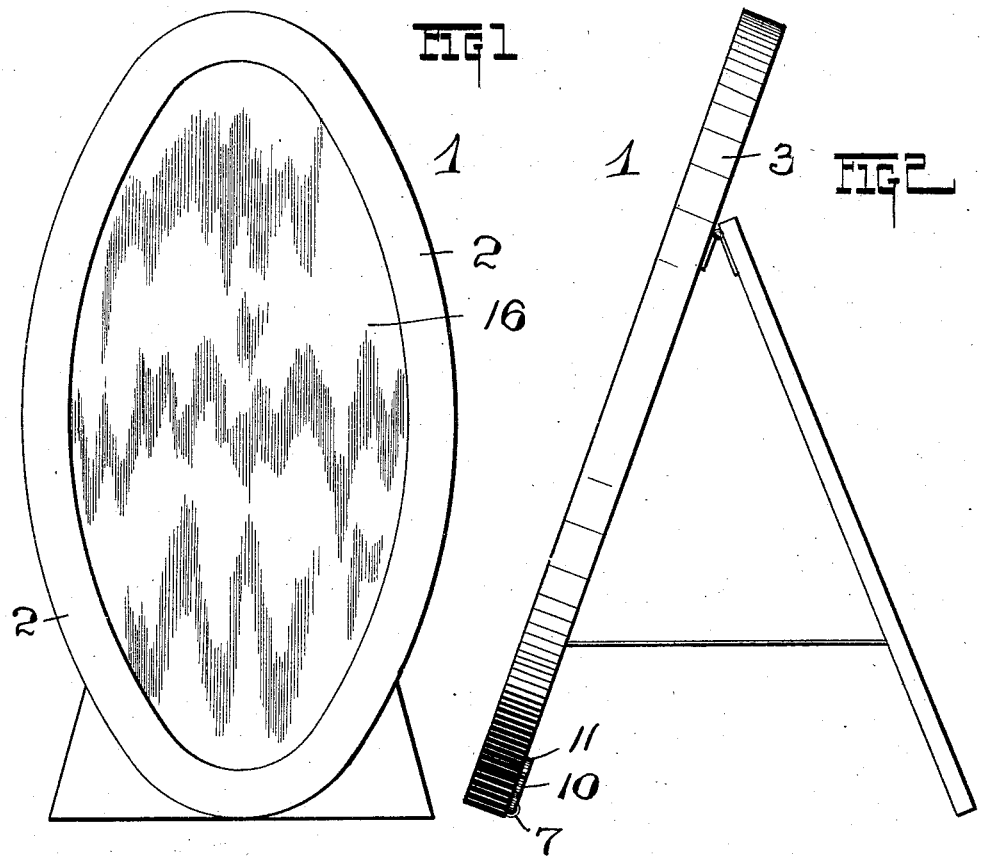
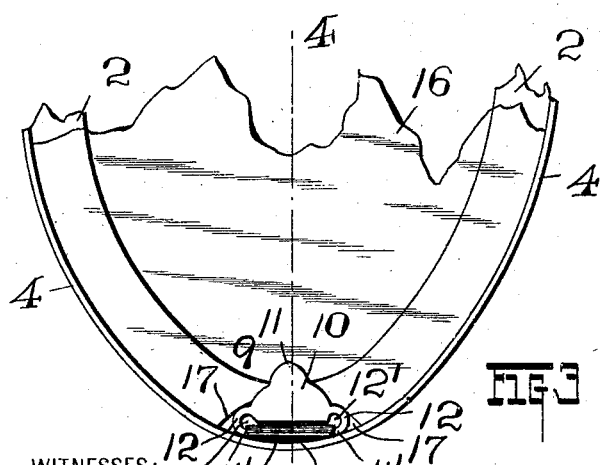
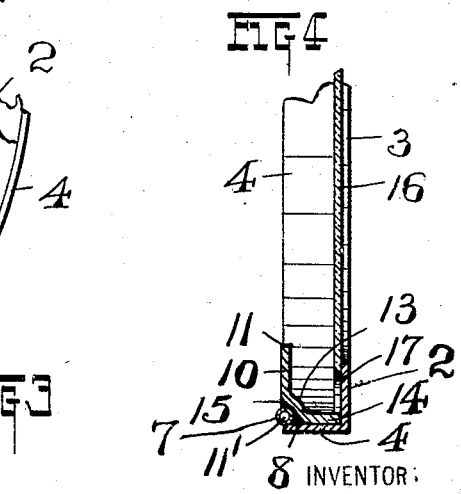
INVENTOR:
Rupert A. Nock,
BY
Fraentzel and Richards,
ATTORNEYS.

No. 872,673. PATENTED DEC. 3, 1907.
R. A. NOCK.
FRAME AND BACK RETAINING DEVICE THEREFOR.
APPLICATION FILED MAY 18, 1907.
2 SHEETS—SHEET 2.
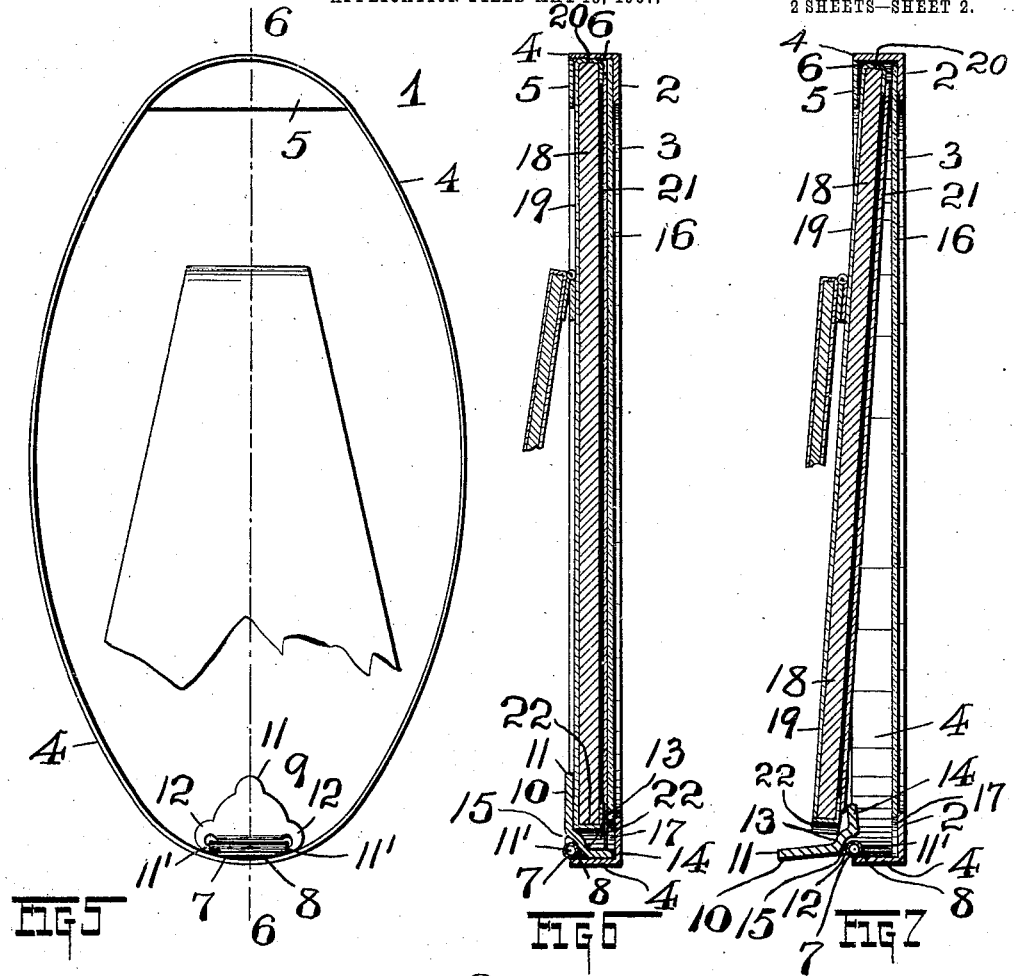
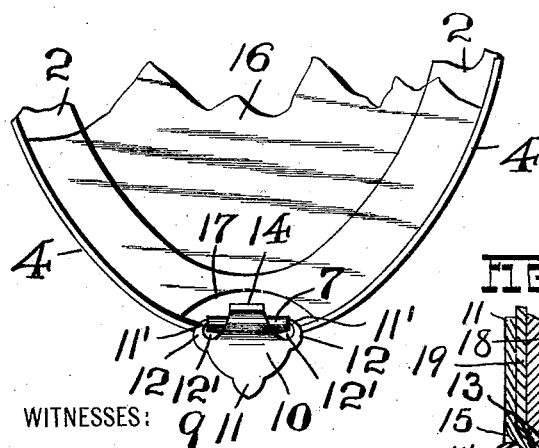
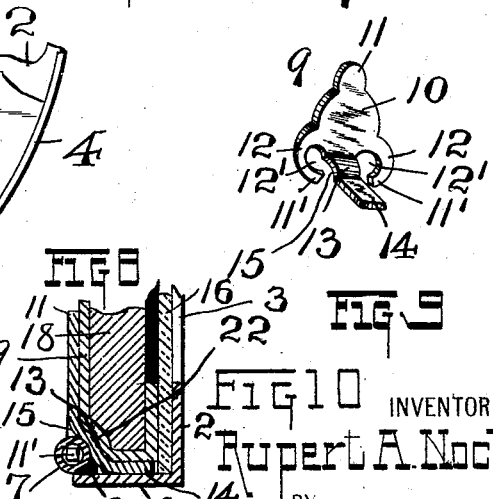
WITNESSES:
Frederick Jamison
Anna H. Alter
INVENTOR:
Rupert A. Nock,
BY Fraentzel and Richards,
ATTORNEYS

UNITED STATES PATENT OFFICE.

RUPERT A. NOCK, OF NEWARK, NEW JERSEY, ASSIGNOR TO THE WILLIAM B. KERR COMPANY, A CORPORATION OF NEW JERSEY.

FRAME AND BACK-RETAINING DEVICE THEREFOR.

No. 872,673.  Specification of Letters Patent.  Patented Dec. 3, 1907.

Application filed May 18, 1907. Serial No. 374,479.

*To all whom it may concern:*

Be it known that I, RUPERT A. NOCK, a citizen of the United States, residing at Newark, in the county of Essex and State of New Jersey, have invented certain new and useful Improvements in Frames and Back-Retaining Devices Therefor; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference, generally, to improvements in frames for pictures, mirrors, hand-glasses, medallions, and the like; and, the invention relates, more particularly, to a frame for the purposes hereinafter set forth and a novel means for quickly and easily arranging and securing, against displacement in the frame, the glass, picture, and the back.

The principal object of this invention is to provide a novel and simply constructed back-retaining or holding device for readily and positively securing the back in said frame, and at the same time providing a holding catch which can be easily and quickly manipulated to permit of the removal of the back from the frame.

A further object of this invention is to provide a back-retaining or holding device, in the form of a pivoted or hinged clamp which is provided with two bearing-members or elements, one of which, when the parts are in the closed or holding engagement with the frame and the back, bears positively against the inner face of the rearwardly projecting flange of the frame, and the other bearing-member or element bearing directly upon the outer surface of the back of the frame, whereby the binding pressure is brought directly upon the back to positively hold or lock the same in its position within the frame, and at the same time removes all pressure or strain from the glass, thereby entirely doing away with the danger or possibility of cracking or breaking the glass.

Other objects of this invention not at this time more particularly enumerated will be clearly understood from the detailed description of the present invention.

The invention consists, therefore, in the novel frame and back-holding or retaining means hereinafter set forth; and, furthermore, this invention consists in the novel arrangements and combinations of the various devices and parts, as well as in the details of the construction of the same, all of which will be hereinafter more fully described and then finally embodied in the clauses of the claims which are appended to and which form an essential part of this invention.

The invention is clearly illustrated in the accompanying drawings, in which:—

Figure 1 is a front view of a picture-frame, and Fig. 2 is a side view of the same, made according to the principles of the present invention. Fig. 3 is a detail rear view of the lower portion of the frame and a portion of the glass therein, with the picture and back removed, and a view of the hinged or pivoted holding or retaining catch; and Fig. 4 is a vertical section of the same, said section being taken on line 4—4 in said Fig. 3. Fig. 5 is a back or rear view of the frame and back therein, with a face view of the holding or retaining catch in its closed relation with the back, showing the latter secured in its held or retained position in the back of the frame; and Fig. 6 is a transverse vertical section, taken on line 6—6 in said Fig. 5. Fig. 7 is a similar sectional representation of the various parts, showing the manner of arranging the holding or retaining catch and the position of the back, prior to securing said back in its positively held or retained position within the frame. Fig. 8 is a rear view of the lower portion of the frame and the glass therein, with a view of the holding or retaining catch, as shown in said Fig. 7; and Fig. 9 is a perspective view of said holding or retaining catch. Fig. 10 is a detail sectional representation of a slightly modified arrangement of the parts.

Similar characters of reference are employed in all of the herein-above described views, to indicate corresponding parts.

Referring now to the several figures of the drawings, the reference-character 1 indicates a suitable frame, such as a picture-frame, a mirror-frame, or a frame for badges, medallions, or the like, which may be of any desired marginal configuration and any desired surface-ornamentation, the frame herein shown being of an oval or elliptical shape.

The said frame usually comprises a suitable facing 2, forming in the front of the frame an opening 3 through which the picture is exposed to view, said facing being provided with a marginal rim 4, substantially as illustrated in the several figures of the drawings.

At a suitable point, preferably at the upper portion of the frame, a plate-like element or bar 5 extends across the back of the same, said plate-like element or bar being suitably secured by means of solder, or in any other suitable manner, to the free marginal edge-portions of the rim 4, whereby a suitable holding or receiving chamber 6 is provided, substantially in the manner illustrated more particularly in Figs. 6 and 7 of the drawings. Suitably secured at some other desired point upon the inner face of the marginal rim 4, preferably directly opposite said plate-like member or bar 5 and the chamber 6 formed thereby, is a tubular element or member 7, which is suitably secured at the outer edge of the rim 4 by means of solder 8, or in any other usual manner. Pivotally connected with said tubular element or barrel 7 is a holding or retaining catch or means 9 made according to and embodying the principal features of the present invention. This holding or retaining catch comprises an ornamental main body or plate 10, formed at one end with a finger-piece or lift 11, and having at its opposite end-portion a pair of horns 12. These horns, as will be seen from an inspection of the several figures of the drawings, both extend rearwardly from the body or plate 10, and each horn is formed at its free end with an inwardly extending projection or teat 11', so as to provide a pair of open portions 12', substantially as illustrated. Integrally connected with, and extending rearwardly from the edge of said body or plate 10, between said open portions 12', is a curved part 13 from which projects, and is integrally connected therewith, a rearwardly extending clamping or retaining lug, finger or arm 14. This holding or retaining catch has its projections or teats 11' inserted in the opposite open ends of the tubular element or barrel 7, so as to be pivotally or rotatably arranged therein, and that the holding or retaining catch oscillates freely with relation to the fixed element or barrel 7, as will be clearly understood. As shown, in the several figures of the drawings, the curved part 13 has its lower surface made convex, as at 15, so as to be concentrically arranged about the outer cylindrical surface of the element or barrel 7, whereby the holding or forcing catch is operatively connected with the frame, and can be oscillated or moved back and forth without striking the element or barrel 7, in the manner and for the purposes to be presently more fully described.

The reference-character 16 indicates the glass of the frame, the same being of the general marginal configuration corresponding to the contour of the inner surface of the rim 4, so as to be fitted directly upon the inner face or surface for the facing 2 of the frame. At a suitable point in the marginal edge-portion of the glass, corresponding to the location of the above described holding or retaining catch is a cut-away or open part 17.

In practice, with the frames of the character herein set forth, a back 18 is employed, this back usually being covered on one of its faces with a covering 19, such as a fabric of velvet, plush, or the like, which is arranged about the marginal edge of the back, as at 20, and is secured upon the opposite face of the back by means of any suitable facing 21. The said back and covering 19 and facing 21 are also formed with an open or cut-away portion 22, corresponding in location to the location of the open or cut-away part 17 of the glass 16. When the frame is used with a picture, the latter is placed between the rear face of the glass 16 and the facing 21, although in the figures of the drawings herewith accompanying the picture has been omitted.

Having thus in a general manner described the features and construction of a frame, which may be used for any number of different purposes, and a holding or retaining means for the back therefor, I will now set forth, in brief, the manner of arranging and retaining the back in its secured position in the back of the frame, tightly clamped or held upon the back of the glass of the frame or against the picture. To secure the said back in place, the holding or clamping device is turned or rotated into the positions indicated in Figs. 7 and 8 of the drawings. The edge-portion 23 of the back is then inserted in the chamber 6, formed by the plate-like member 5 and the contiguous portion of the rim 4, the opposite edge-portion 24 being placed and resting upon the face 25 of the finger, lug or arm 14, the curved portion 13 and the body or plate 10 of the holding or clamping means being arranged in and projecting from the open or cut-away portion 22 of the back 18, substantially in the manner illustrated in said Fig. 7 of the drawings. Now, by rotating the parts of the holding or clamping means or catch into the positions shown in Figs. 6 and 10 of the drawings, the lug, finger or arm 14 enters the opening or cut-away part 17 of the glass 16, the said lug, finger or arm being forcibly brought into frictional holding engagement with the inner surface-portion of the rim 4, the inner face of the said plate or body 10 of the holding or retaining catch bearing firmly in frictional holding or retaining engagement with a portion of the rear face of the back 16 or its covering 19. In this manner, the back is securely and positively held in the frame against any accidental displacement; and, at the same time, the free end-portion of the body or plate 10 serves as a fingerpiece for moving the holding or retaining device or clamp into its unlocked or disengaged position for partially lifting the back from within the frame, as shown in Fig. 7, when it is desired to remove the back from said frame, as will be clearly evident.

From the foregoing description of my invention it will be clearly seen, that I have produced a most simply constructed and efficiently operating device for the purposes stated in the foregoing description, which is not only most useful in its operation but is also highly ornamental.

I claim:—

1. In a device of the character set forth, a frame provided with a removable back and a holding or retaining means connected with a portion of said frame, said means comprising a pair of right-angled members, one of said members extending beneath and in lifting engagement with said back and being adapted to be brought in holding engagement with a portion of said frame, and the other member of said holding or retaining means being adapted to be brought in binding engagement with a portion of said back.

2. In a device of the character set forth, a frame provided with a removable back and a holding or retaining means connected with a portion of said frame, said means comprising a pair of right-angled members, one of said members extending beneath and in lifting engagement with said back and being adapted to be brought in holding engagement with a portion of said frame, and the other member of said holding or retaining means being adapted to be brought in binding engagement with a portion of said back, and a retaining plate-like member connected with another portion of the frame beneath which a portion of the back is adapted to be arranged.

3. In a device of the character set forth, a frame provided with a removable back and a holding or retaining means connected with a portion of said frame, said means comprising a pair of right-angled members, one of said members extending beneath and in lifting engagement with said back and being adapted to be brought in holding engagement with a portion of said frame, and the other member of said holding or retaining means being adapted to be brought in binding engagement with a portion of said back, and a finger-piece connected with said last-mentioned member of said holding or retaining means.

4. In a device of the character set forth, a frame provided with a removable back and a holding or retaining means connected with a portion of said frame, said means comprising a pair of right-angled members, one of said members extending beneath and in lifting engagement with said back and being adapted to be brought in holding engagement with a portion of said frame, and the other member of said holding or retaining means being adapted to be brought in binding engagement with a portion of said back, a finger-piece connected with said last-mentioned member of said holding or retaining means, and a retaining plate-like member connected with another portion of the frame beneath which a portion of the back is adapted to be arranged.

5. In a device of the character set forth, a frame provided with a rearwardly extending rim, a removable back surrounded by said rim, and a holding or retaining means connected with a portion of said rim, said means comprising a pair of right-angled members, one of said members extending beneath and in lifting engagement with said back and being adapted to be brought in holding engagement with a portion of said rim, and the other member of said holding or retaining means being adapted to be brought in binding engagement with a portion of said back.

6. In a device of the character set forth, a frame provided with a rearwardly extending rim, a removable back surrounded by said rim, and a holding or retaining means connected with a portion of said rim, said means comprising a pair of right-angled members, one of said members extending beneath and in lifting engagement with said back and being adapted to be brought in holding engagement with a portion of said rim, and the other member of said holding or retaining means being adapted to be brought in binding engagement with a portion of said back, and a retaining plate-like member connected with another portion of the rim beneath which a portion of the back is adapted to be arranged.

7. In a device of the character set forth, a frame provided with a rearwardly extending rim, a removable back surrounded by said rim, and a holding or retaining means connected with a portion of said rim, said means comprising a pair of right-angled members, one of said members extending beneath and in lifting engagement with said back and being adapted to be brought in holding engagement with a portion of said rim, and the other member of said holding or retaining means being adapted to be brought in binding engagement with a portion of said back, and a finger-piece connected with said last-mentioned member of said holding or retaining means.

8. In a device of the character set forth, a frame provided with a rearwardly extending rim, a removable back surrounded by said rim, and a holding or retaining means connected with a portion of said rim, said means comprising a pair of right-angled members, one of said members extending beneath and in lifting engagement with said back and being adapted to be brought in holding engagement with a portion of said rim, and the other member of said holding or retaining means being adapted to be brought in binding engagement with a portion of said back, a finger-piece connected with said last-mentioned member of said holding or retaining means, and a retaining plate-like member connected with another portion of the frame beneath which a portion of the back is adapted to be arranged.

9. In a device of the character set forth, a frame provided with a removable back, said back being formed with an open part, and a holding or retaining means pivotally connected with a portion of said frame, said means comprising a retaining lug movably arranged in the open part of said back and adapted to be brought in holding engagement with a portion of said frame, and a plate-like clamping element adapted to be brought in binding engagement with a portion of said back, substantially as and for the purposes set forth.

10. In a device of the character set forth, a frame provided with a removable back, said back being formed with an open part, and a holding or retaining means pivotally connected with a portion of said frame, said means comprising a retaining lug movably arranged in the open part of said back and adapted to be brought in holding engagement with a portion of said frame, and a plate-like clamping element adapted to be brought in binding engagement with a portion of said back, and a retaining plate-like member connected with another portion of the frame beneath which a portion of the back is adapted to be arranged, substantially as and for the purposes set forth.

11. In a device of the character set forth, a frame provided with a removable back, said back being formed with an open part, and a holding or retaining means pivotally connected with a portion of said frame, said means comprising a retaining lug movably arranged in the open part of said back and adapted to be brought in holding engagement with a portion of said frame, and a plate-like clamping element adapted to be brought in binding engagement with a portion of said back, and a finger-piece connected with said plate-like clamping member, substantially as and for the purposes set forth.

12. In a device of the character set forth, a frame provided with a removable back, said back being formed with an open part, and a holding or retaining means pivotally connected with a portion of said frame, said means comprising a retaining lug movably arranged in the open part of said back and adapted to be brought in holding engagement with a portion of said frame, and a plate-like clamping element adapted to be brought in binding engagement with a portion of said back, and a finger-piece connected with said plate-like clamping member, and a retaining plate-like member connected with another portion of the frame beneath which a portion of the back is adapted to be arranged, substantially as and for the purposes set forth.

13. In a device of the character set forth, a frame provided with a rearwardly extending rim, a removable back surrounded by said rim, said back being formed with an open part, and a holding or retaining means pivotally connected with a portion of said rim, said means comprising a retaining lug movably arranged in the open part of said back and adapted to be brought in holding engagement with a portion of said rim, and a plate-like clamping element adapted to be brought in binding engagement with a portion of said back, substantially as and for the purposes set forth.

14. In a device of the character set forth, a frame provided with a rearwardly extending rim, a removable back surrounded by said rim, said back being formed with an open part, and a holding or retaining means pivotally connected with a portion of said rim, said means comprising a retaining lug movably arranged in the open part of said back and adapted to be brought in holding engagement with a portion of said rim, and a plate-like clamping element adapted to be brought in binding engagement with a portion of said back, and a plate-like member connected with another portion of said rim beneath which a portion of said back is adapted to be arranged, substantially as and for the purposes set forth.

15. In a device of the character set forth, a frame provided with a rearwardly extending rim, a removable back surrounded by said rim, said back being formed with an open part, and a holding or retaining means pivotally connected with a portion of said rim, said means comprising a retaining lug movably arranged in the open part of said back and adapted to be brought in holding engagement with a portion of said rim, and a plate like clamping element adapted to be brought in binding engagement with a portion of said back, and a finger-piece connected with said plate-like clamping member, substantially as and for the purposes set forth.

16. In a device of the character set forth, a frame provided with a rearwardly extending rim, a removable back surrounded by said rim, said back being formed with an open part, and a holding or retaining means pivotally connected with a portion of said rim, said means comprising a retaining lug movably arranged in the open part of said back and adapted to be brought in holding engagement with a portion of said rim, and a plate-like clamping element adapted to be brought in binding engagement with a portion of said back, and a plate-like member connected with another portion of said rim beneath which a portion of said back is adapted to be arranged, and a finger-piece connected with said plate-like clamping member, substantially as and for the purposes set forth.

17. In a device of the character set forth, a frame provided with a glass having an open part, a removable back also provided with an open part which registers with the open part in said glass, and a holding or retaining means pivotally connected with a portion of said frame, said means comprising a retaining lug movably arranged in the open parts of said back and said glass, and a plate-like clamping element adapted to be brought in binding engagement with a portion of said back, substantially as and for the purposes set forth.

18. In a device of the character set forth, a frame provided with a glass having an open part, a removable back also provided with an open part which registers with the open part in said glass, and a holding or retaining means pivotally connected with a portion of said frame, said means comprising a retaining lug movably arranged in the open parts of said back and said glass, and a plate-like clamping element adapted to be brought in binding engagement with a portion of said back, and a retaining plate-like member connected with another portion of the frame beneath which a portion of the back is adapted to be arranged, substantially as and for the purposes set forth.

19. In a device of the character set forth, a frame provided with a glass having an open part, a removable back also provided with an open part which registers with the open part in said glass, and a holding or retaining means pivotally connected with a portion of said frame, said means comprising a retaining lug movably arranged in the open parts of said back and said glass, and a plate-like clamping element adapted to be brought in binding engagement with a portion of said back, and a finger-piece connected with that portion of said means which engages with said back, substantially as and for the purposes set forth.

20. In a device of the character set forth, a frame provided with a glass having an open part, a removable back also provided with an open part which registers with the open part in said glass, and a holding or retaining means pivotally connected with a portion of said frame, said means comprising a retaining lug movably arranged in the open parts of said back and said glass, and a plate-like clamping element adapted to be brought in binding engagement with a portion of said back, and a finger-piece connected with that portion of said means which engages with said back, and a retaining plate-like member connected with another portion of the frame beneath which a portion of the back is adapted to be arranged, substantially as and for the purposes set forth.

21. In a device of the character set forth, a frame provided with a rearwardly extending rim, a glass having an open part, a removable cover also provided with an open part which registers with the open part of said glass, said glass and back being surrounded by said rim, and a holding or retaining means pivotally connected with a portion of said rim, said means comprising a retaining lug movably arranged in the open parts of said back and said glass, and a plate-like clamping element adapted to be brought in binding engagement with a portion of said back, substantially as and for the purposes set forth.

22. In a device of the character set forth, a frame provided with a rearwardly extending rim, a glass having an open part, a removable cover also provided with an open part which registers with the open part of said glass, said glass and back being surrounded by said rim, and a holding or retaining means pivotally connected with a portion of said rim, said means comprising a retaining lug movably arranged in the open parts of said back and said glass, and a plate-like clamping element adapted to be brought in binding engagement with a portion of said back, and a plate-like member connected with another portion of said rim beneath which a portion of said back is adapted to be arranged, substantially as and for the purposes set forth.

23. In a device of the character set forth, a frame provided with a rearwardly extending rim, a glass having an open part, a removable cover also provided with an open part which registers with the open part of said glass, said glass and back being surrounded by said rim, and a holding or retaining means pivotally connected with a portion of said rim, said means comprising a retaining lug movably arranged in the open parts of said back and said glass, and a plate-like clamping element adapted to be brought in binding engagement with a portion of said back, and a finger-piece connected with said plate-like clamping member, substantially as and for the purposes set forth.

24. In a device of the character set forth, a frame provided with a rearwardly extending rim, a glass having an open part, a removable cover also provided with an open part which registers with the open part of said glass, said glass and back being surrounded by said rim, and a holding or retaining means pivotally connected with a portion of said rim, said means comprising a retaining lug movably arranged in the open parts of said back and said glass, and a plate-like clamping element adapted to be brought in binding engagement with a portion of said back, and a plate-like member connected with another portion of said rim beneath which a portion of said back is adapted to be arranged, and a finger-piece connected with said plate-like clamping member, substantially as and for the purposes set forth.

25. A frame provided with an inwardly extending rim, a tubular barrel attached to said rim, and a holding or retaining means pivotally connected with said barrel, comprising a plate-like clamping element, an angularly extending clamping lug projecting from said element, a pair of horns connected with said plate-like clamping element, and pivot-teats on said horns extending into the opposite open ends of said barrel, substantially as and for the purposes set forth.

26. A frame provided with an inwardly extending rim, a tubular barrel attached to said rim, and a holding or retaining means pivotally connected with said barrel, comprising a plate-like clamping element, an angularly extending clamping lug projecting from said element, a pair of horns connected with said plate-like clamping element, and pivot-teats on said horns extending into the opposite open ends of said barrel, and a curved member between said clamping plate and said clamping lug concentrically disposed about said tubular barrel, substantially as and for the purposes set forth.

27. A frame provided with an inwardly extending rim, a tubular barrel attached to said rim, and a holding or retaining means pivotally connected with said barrel, comprising a plate-like clamping element, an angularly extending clamping lug projecting from said element, a pair of horns connected with said plate-like clamping element, and pivot-teats on said horns extending into the opposite open ends of said barrel, all combined with a removable back in said frame, said back being provided with an open edge-portion in which said clamping lug is movably disposed, and said plate-like clamping element being adapted to be brought in engagement with a portion of said back, substantially as and for the purposes set forth.

28. A frame provided with an inwardly extending rim, a tubular barrel attached to said rim, and a holding or retaining means pivotally connected with said barrel, comprising a plate-like clamping element, an angularly extending clamping lug projecting from said element, a pair of horns connected with said plate-like clamping element, and pivot-teats on said horns extending into the opposite open ends of said barrel, and a curved member between said clamping plate and said clamping lug concentrically disposed about said tubular barrel, all combined with a removable back in said frame, said back being provided with an open edge-portion in which said clamping lug is movably disposed, and said plate-like clamping element being adapted to be brought in engagement with a portion of said back, substantially as and for the purposes set forth.

29. The herein described holding or clamping catch comprising a plate-like clamping element, an angularly extending clamping lug projecting from said element, a pair of horns connected with said plate-like clamping element, and pivot-teats extending from said horns in directions toward each other, substantially as and for the purposes set forth.

30. The herein described holding or clamping catch comprising a plate-like clamping element, an angularly extending clamping lug projecting from said element, a pair of horns connected with said plate-like clamping element, and pivot-teats extending from said horns in directions toward each other, and a curved member between said clamping plate and said clamping lug concentrically disposed about said tubular barrel, substantially as and for the purposes set forth.

In testimony, that I claim the invention set forth above I have hereunto set my hand this 30th day of April, 1907.

RUPERT A. NOCK.

Witnesses:
FREDK. C. FRAENTZEL,
ANNA H. ALTER.